United States Patent
Zhang et al.

(10) Patent No.: US 12,262,403 B2
(45) Date of Patent: Mar. 25, 2025

(54) METHOD AND APPARATUS FOR PRIORITIZING UPLINK OR DOWNLINK FLOWS IN MULTI-PROCESSOR DEVICE

(71) Applicant: QUALCOMM Incorporated, San Diego, CA (US)

(72) Inventors: Juan Zhang, San Diego, CA (US); Ajith Tom Payyappilly, San Diego, CA (US); Sitaramanjaneyulu Kanamarlapudi, San Diego, CA (US); Uppinder Babbar, San Diego, CA (US); Vamsi Dokku, San Diego, CA (US); Vinay Paradkar, Broomfield, CO (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 17/358,673

(22) Filed: Jun. 25, 2021

(65) Prior Publication Data
US 2022/0417942 A1 Dec. 29, 2022

(51) Int. Cl.
*H04W 72/56* (2023.01)
(52) U.S. Cl.
CPC .................. *H04W 72/56* (2023.01)
(58) Field of Classification Search
CPC .................................................... H04W 72/10
See application file for complete search history.

(56) References Cited

U.S. PATENT DOCUMENTS

2015/0312931 A1* 10/2015 Jin ..................... H04W 72/10
370/329
2019/0268798 A1* 8/2019 Jeong ................. H04W 28/06

FOREIGN PATENT DOCUMENTS

CA 2569627 A1 * 12/2005
CA 3062490 A1 * 11/2019 ........ H04W 28/0252

OTHER PUBLICATIONS

International Search Report and Written Opinion—PCT/US2022/029696—ISA/EPO—Aug. 23, 2022.

* cited by examiner

*Primary Examiner* — Saad A. Waqas
(74) *Attorney, Agent, or Firm* — QUALCOMM Incorporated

(57) ABSTRACT

A UE may include one or more application processors and a modem processor. The modem processor may include flow priority engine configured to receive, from the one or more application processors, requests for determining priority treatment of one or more packet filters of one or more uplink transmissions and transmit the one or more uplink transmissions to a base station based on priorities of the one or more uplink transmissions. The priorities of the uplink transmissions may be determined based on at least one of the requests for priority treatment received from the one or more application processors, mapping of uplink transmissions to radio bearers, the priorities of the radio bearers, or one or more configuration rules.

26 Claims, 12 Drawing Sheets

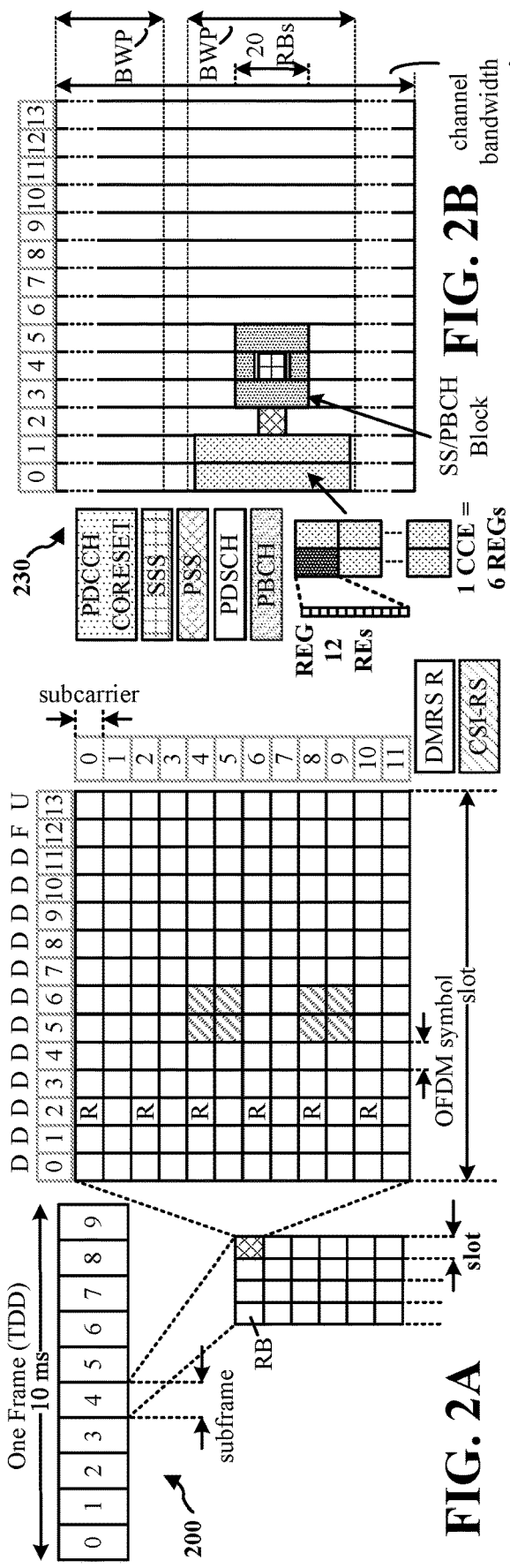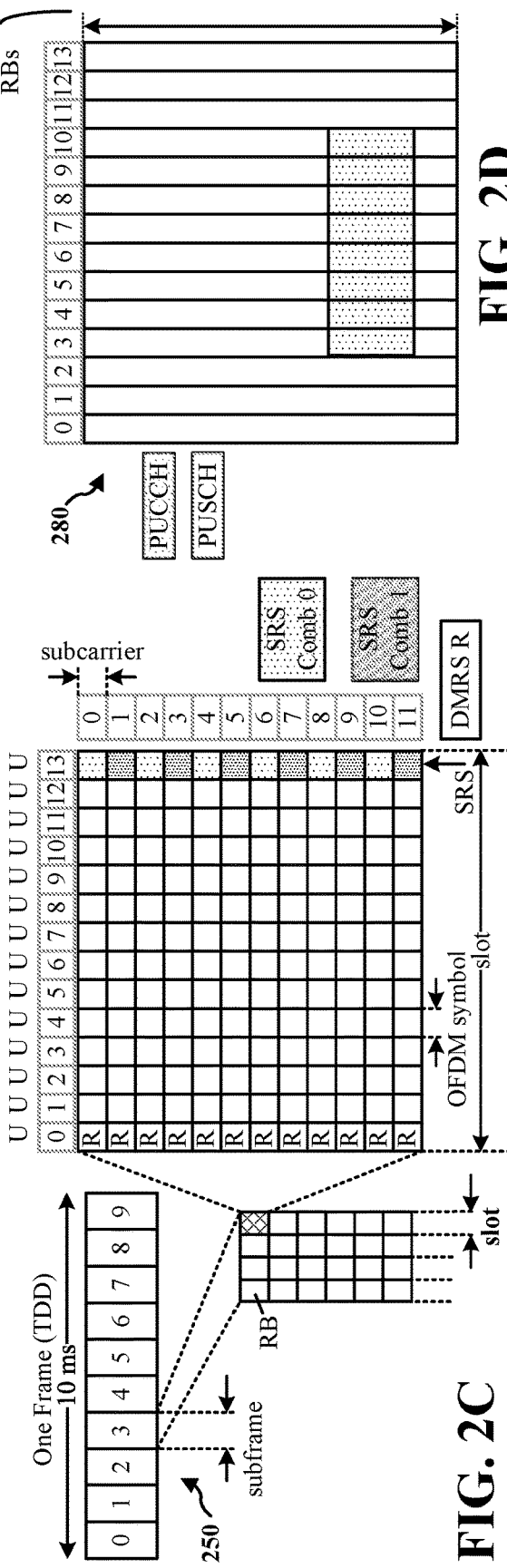
FIG. 2A
FIG. 2B
FIG. 2C
FIG. 2D

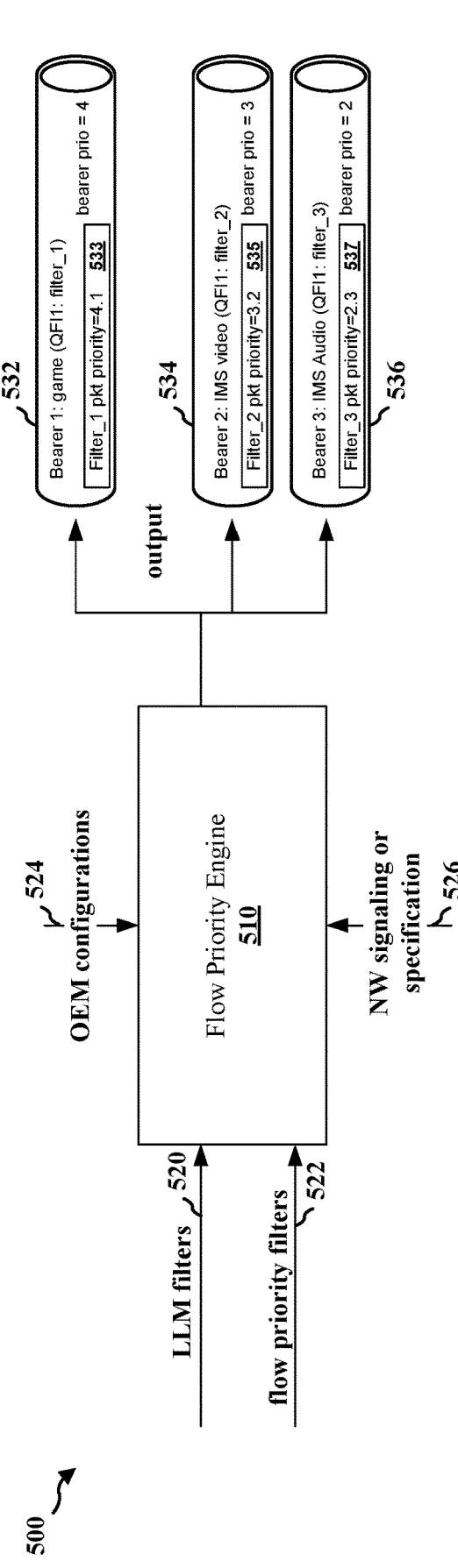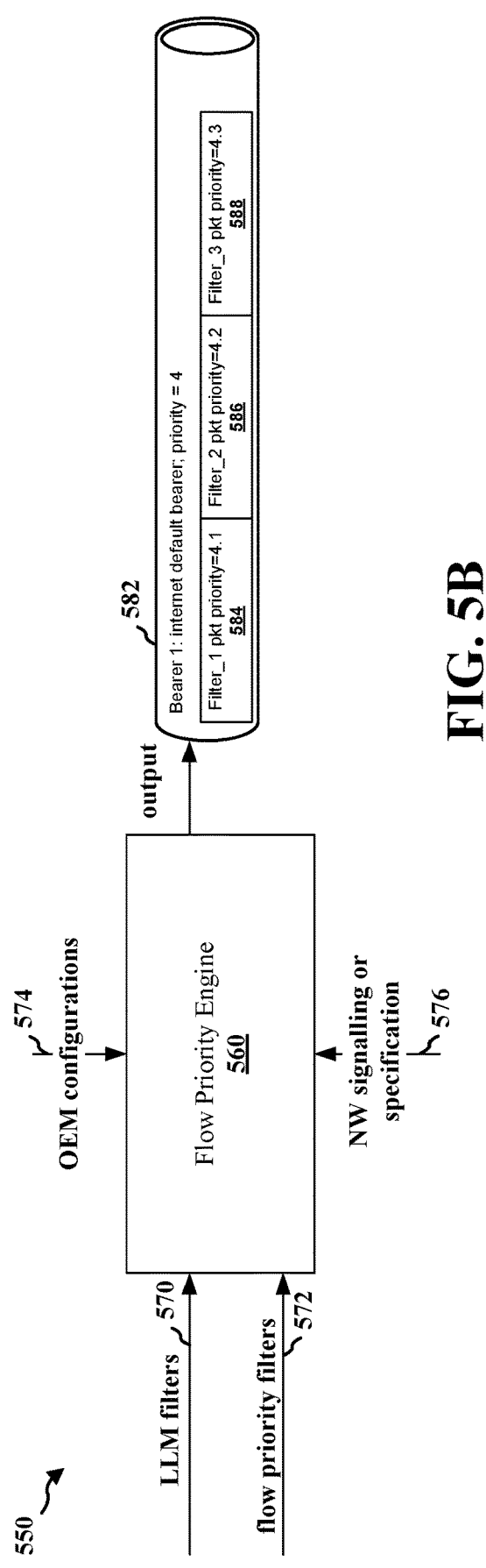

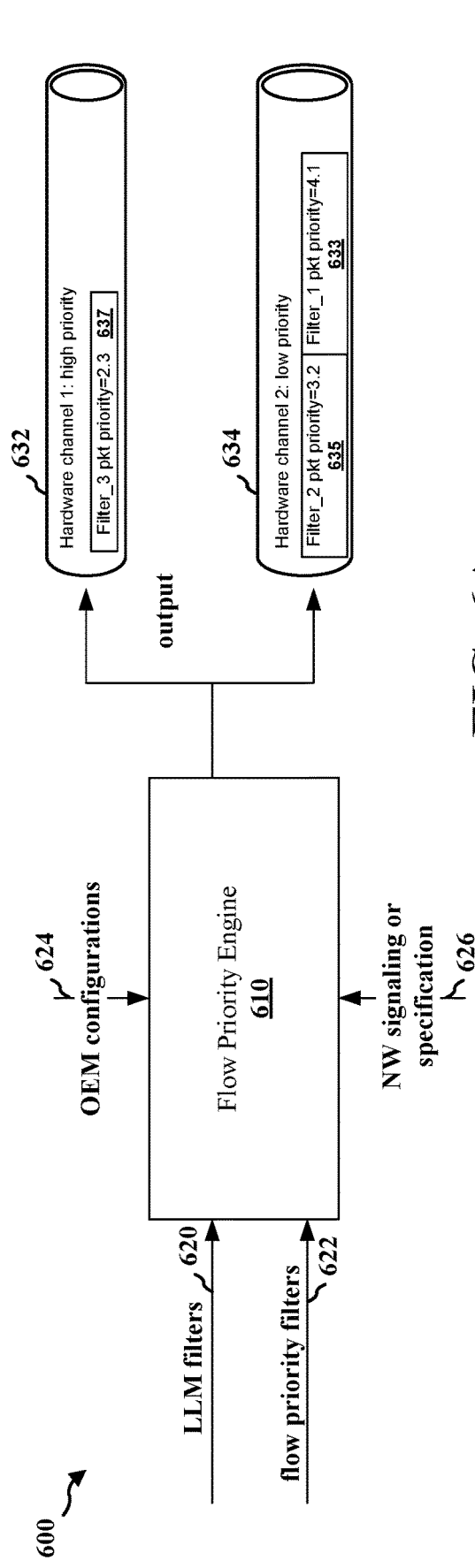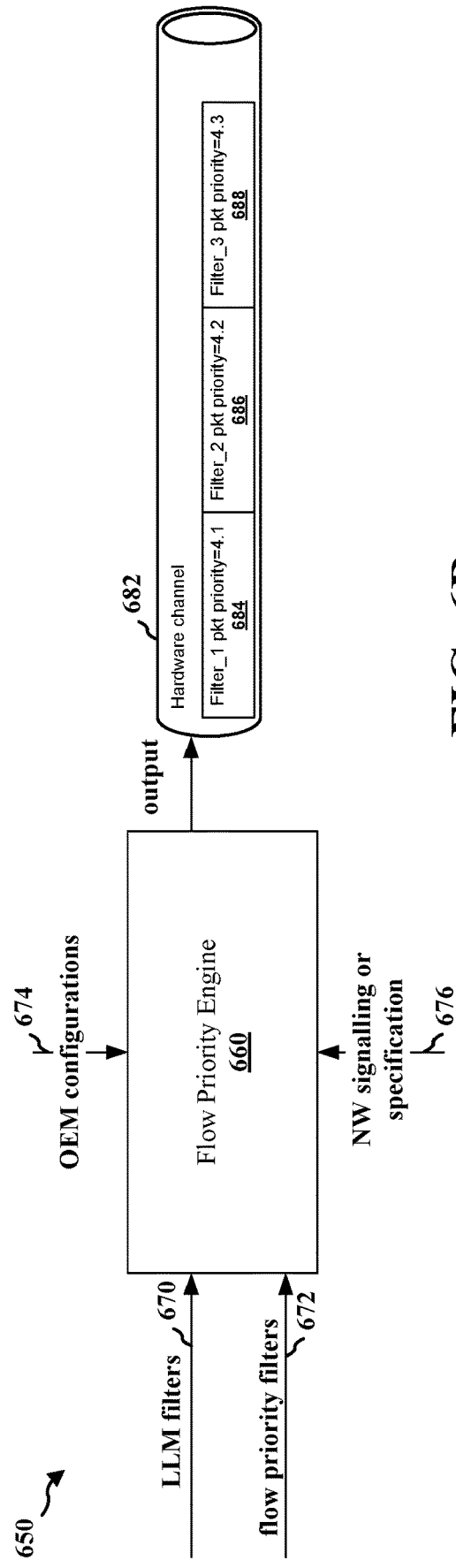
FIG. 6A
FIG. 6B

METHOD AND APPARATUS FOR PRIORITIZING UPLINK OR DOWNLINK FLOWS IN MULTI-PROCESSOR DEVICE

TECHNICAL FIELD

The present disclosure relates generally to communication systems, and more particularly, to a processor in a multi-processor to prioritize uplink or downlink flows.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a UE including one or more application processors and a modem processor. The modem processor may include flow priority engine configured to receive, from the one or more application processors, requests for determining priority treatment of one or more packet filters of one or more uplink transmissions and transmit the one or more uplink transmissions to a base station based on priorities of the one or more uplink transmissions. The priorities of the uplink transmissions may be determined based on at least one of the requests for priority treatment received from the one or more application processors, mapping of uplink transmissions to radio bearers, the priorities of the radio bearers, or one or more configuration rules.

In one aspect, the flow priority engine may determine relative priorities of the one or more uplink transmissions based on at least one of the requests for priority treatment received from the one or more application processors or the one or more configuration rules, and determine the priorities of the one or more uplink transmissions based on the relative priorities of the one or more uplink transmissions and at least one of the mapping of uplink transmissions to radio bearers or the priorities of the radio bearers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 5A and 5B are examples of flow priority engine for uplink flows of a method of wireless communication.

FIGS. 6A and 6B are examples of flow priority engine for downlink flows of a method of wireless communication.

DETAILED DESCRIPTION

Figure 1:
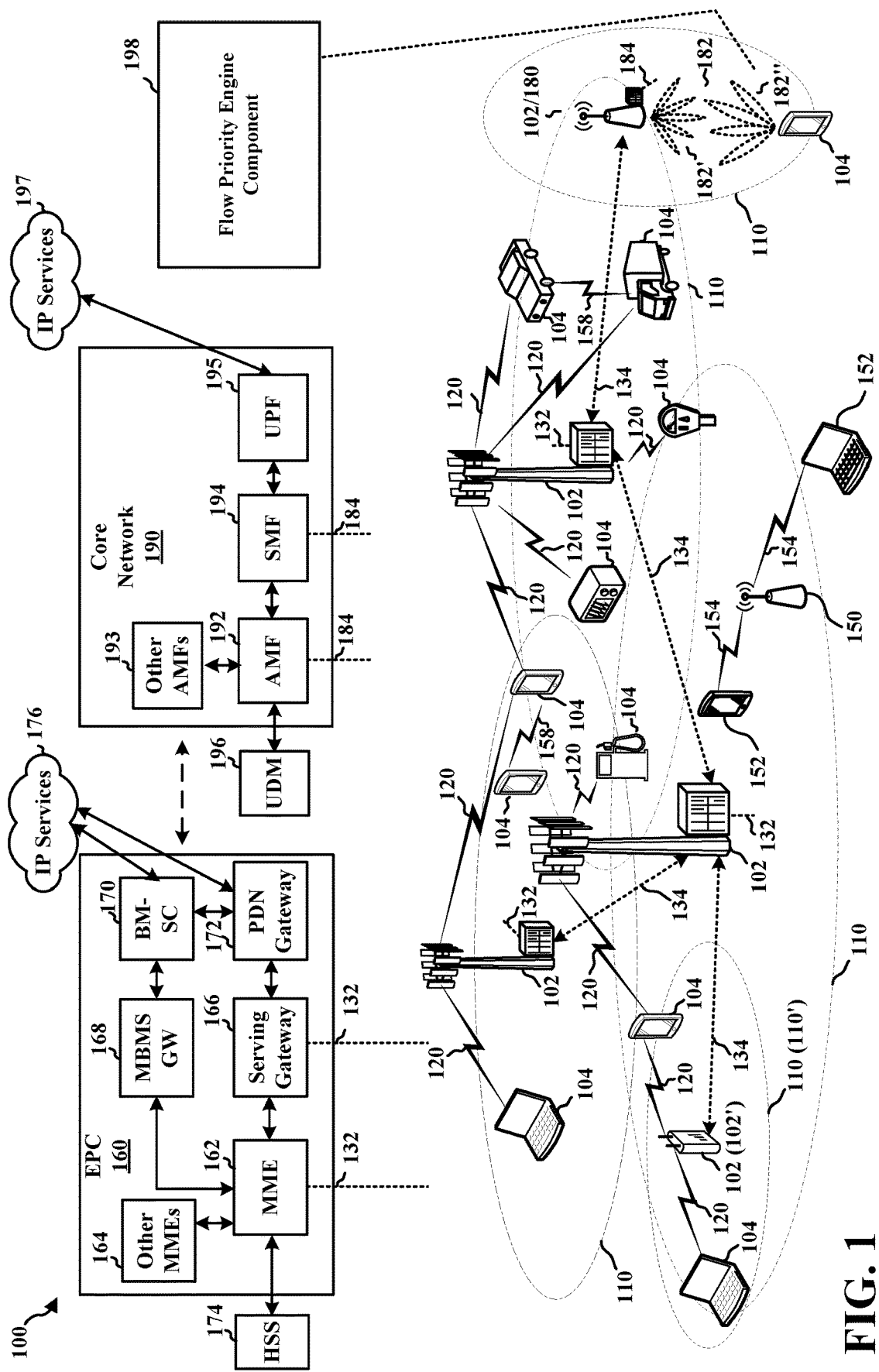
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be include a flow priority engine component 198 configured to receive, from one or more application processors, requests for determining priority treatment of one or more packet filters of one or more uplink transmissions, and transmit the one or more uplink transmissions from the one or more application processors to a base station based on priorities of the one or more uplink transmissions. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |

| μ | SCS $\Delta f = 2^\mu \cdot 15[kHz]$ | Cyclic prefix |
|---|---|---|
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to 2μ*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
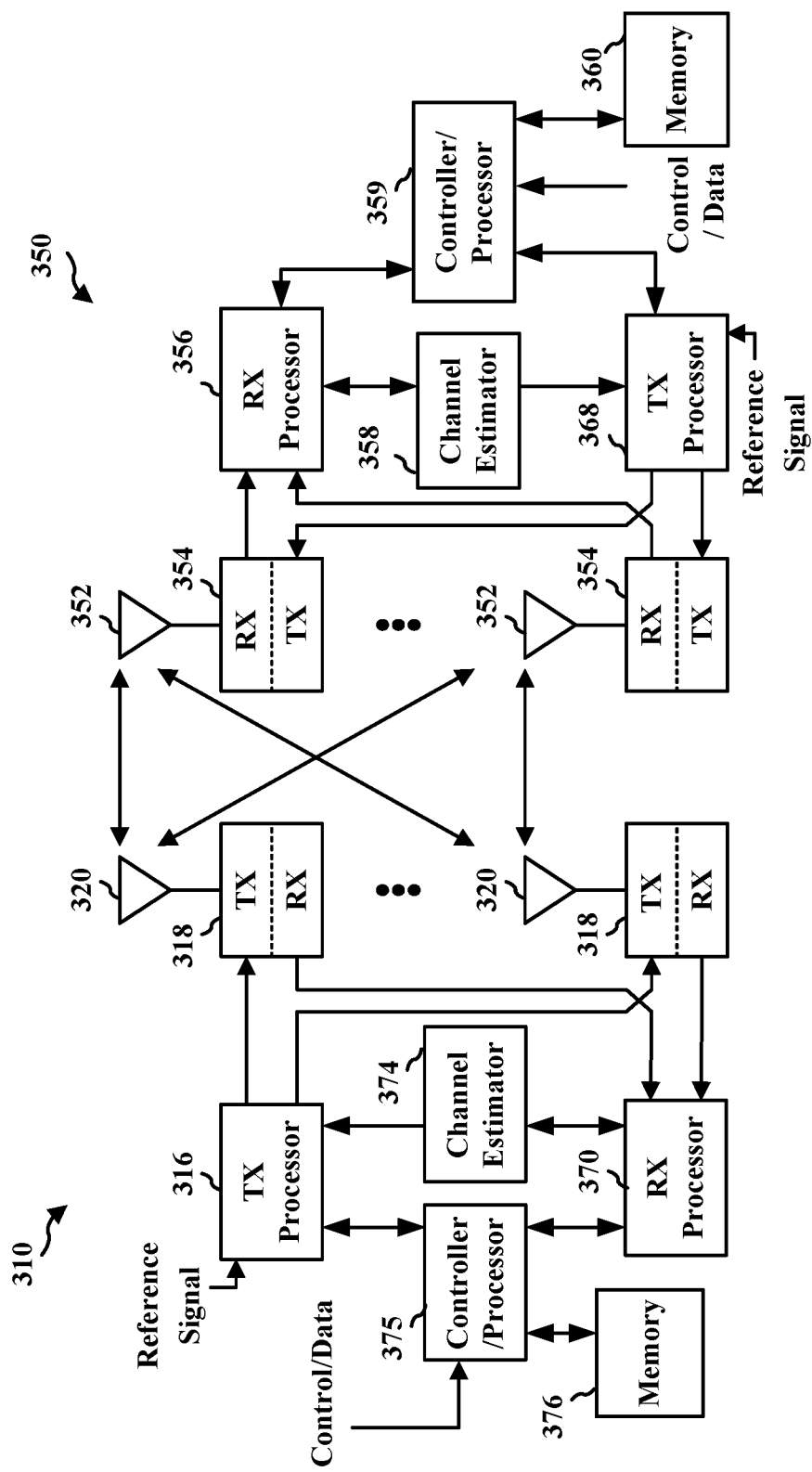
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality. The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization. Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

In some aspects, a wireless network, i.e., network, may include a base station that communicates with a user equipment (UE). The user equipment may include one or more processors, and the one or more processors may include a cellular baseband processor, i.e., a modem, coupled to or including a cellular transceiver that transmits and receives communication with the base station. In some aspects, multiple radio bearers may be established between the modem and the network. That is, the base station or the network may configure one or more radio bearers between the UE, including the modem, and the base station to exchange uplink signals and downlink signals. The network may configure multiple radio bearers for multiple communications having a plurality of quality of service specifications.

The UE may transmit one or more uplink flows (which may be referred to as uplink QoS flows) to the base station via multiple radio bearers and/or may receive one or more downlink flows (or downlink QoS flows) from the base station over the multiple radio bearers. The base station and the UE may determine priorities of the one or more uplink flows that may be transmitted to the base station via the multiple radio bearers between the base station and the UE.

In one aspect, the base station and the UE may determine the radio bearer to carry each of the one or more uplink flows based on the configuration of the multiple radio bearers. That is, the base station may configure one or more data radio bearers (DRBs) between the UE and the base station, the configuration mapping each of the multiple radio bearers respectively to one or more uplink flows. The multiple radio bearers may be assigned with corresponding radio bearer priorities. The UE may also determine the priorities of downlink packets from the downlink reception and send the downlink packets with higher priority over high-priority pipes (or hardware channels) between the modem processor and the application processors based on the determined priorities of the downlink flows.

In another aspect, the base station and the UE may determine how to prioritize among uplink flows that are transported on the same UL radio bearer on the air link. That is, more than one uplink flow may be mapped to one radio bearer, and the base station and the UE may determine the priorities of the uplink flows that are mapped to the same radio bearers. The base station and the UE may configure the uplink communication based on the determined priorities among the uplink flows mapped to the same radio bearers. The base station and the UE may determine a physical uplink data channels, i.e., PUSCH, to carry the uplink flows based on the priorities, and may determine to cancel or delay the uplink flow with low priorities based on the channel state of the uplink air link.

In some aspects, the UE may include multiple processors, e.g., application processors and a modem processor, and the base station and the UE may determine how to prioritize the multiple uplink flows received from the multiple processors. That is, the modem processor may receive the multiple uplink flows from the multiple processors including the application processors and prioritize the multiple uplink flows received from the multiple processors. The priority of the multiple uplink flows received from the multiple processors may be determined based on agreements between the modem processor and the application processors, and corresponding OEM configurations.

Figure 4:
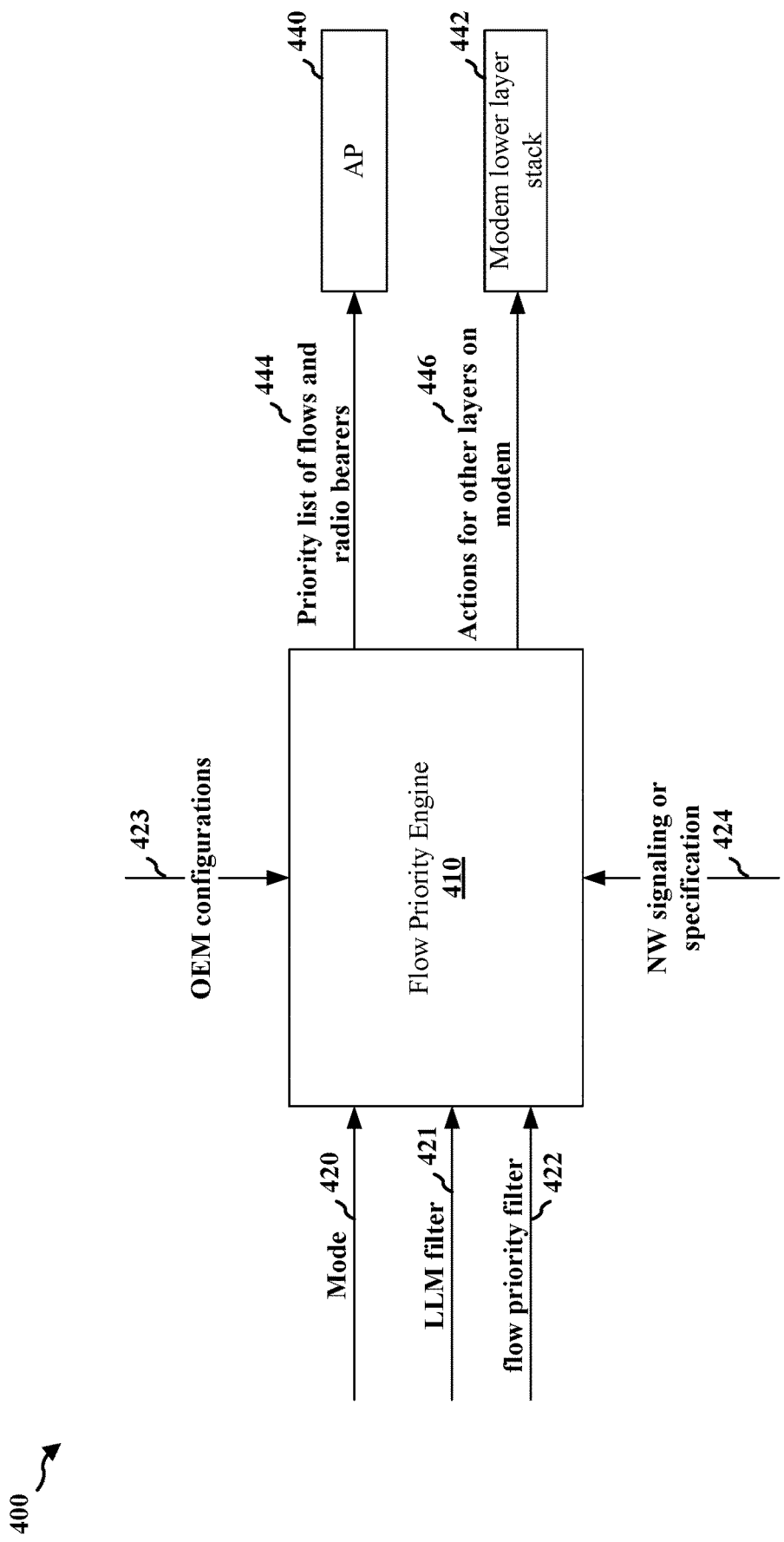
FIG. 4 is an example of a flow priority engine of a method of wireless communication.

Various models IP-Multimedia Subsystem (IMS) may be configured between the modem processor and the application processors. In some aspects, an IMS may be performed at the modem processor. That is, a first application processor may be controlled by an IMS configuration of the modem processor. In other aspects, an IMS solution may be performed at the application processor for the UL flows originate there. That is, a second application processor may be controlled by an IMS configuration that is different from the modem processor. In other aspects, a hybrid model may include a part of the IMS is controlled by, or performed by, the modem processor, whereas other parts of the IMS are performed by the applications processor. For example, in the hybrid model, some flows may originate at the modem and other flows may originate at an application processor. Aspects presented herein enable the network and the UE to unify the different configurations of IMS as provided above and further provide for application of the NW-initiated QoS and network slicing. FIG. 4 is an example diagram 400 of a flow priority engine (or algorithm) 410 of a UE for wireless communication with a network. The UE may include a modem processor that may include the flow priority engine 410.

In some aspects, a set of call-flows and message exchanges may be defined between a cellular modem processor, e.g., a modem processor and application processors of the UE. The modem processor may include an algorithm or an engine, i.e., the flow priority engine 410, implemented to determine priorities of the uplink flows received from multiple processors and/or downlink flows to be transmitted to the multiple processors. That is, the modem processor may receive a plurality of inputs from application processors and/or the network and may determine the priorities of the uplink flows received from the multiple processors, and the downlink flows received from the network to be transmitted to the multiple processors based on the received plurality of inputs. The plurality of inputs of multiple specifications or configurations may include at least one of the inputs received from end applications/high-level operating systems (HLOSs), inputs from OEM configurations, over-the-air (OTA) signaling received from the network configuring the radio bearers, the mapping of the uplink/downlink flows to radio bearers, the mapping of the network slices or UE route selection policy (URSP) configuration for managing the network slices for the UE, or a configuration based on one or more specifications for a wireless standard.

For example, the plurality of inputs of multiple specifications or configurations from application processors or the network may include at least one of modes 420 of the application, low-latency mode (LLM) filters 421, flow priority filters 422, OEM configurations 423, or network signaling or specification 424. The modes 420 of the application may be received from the application processors, e.g., normal application, gaming application, extended reality (XR) application, etc., and the mode of the application may be associated with corresponding priority or latency specification. The LLM filters 421 of the uplink/downlink flows that may be received from the application processors and indicate the uplink flows that have the low-latency specification. The flow priority filters 422 may be received from the application processors and indicate the priority of the uplink/downlink flows based on the service of the uplink/downlink flows, e.g., streaming, IMS video, audio, etc.

The OEM configurations 423 or the network signaling or specification 424 may include a list of priorities of the uplink/downlink flows, and the application processors and the modem processor may follow the OEM configurations 423 or the network signaling or specification 424. In one aspect, the modem processor and the application processors may follow the OEM configurations 423 or the network signaling or specification 424 over the modes 420, LLM filters 421, or the flow priority filters 422 received from the application processors.

The UE may unify the plurality of inputs of the multiple specifications or configurations received from application processors or the network, e.g., the base station, into a list of flows in a combined priority order (which may be referred to herein as an absolute priority order) of the uplink/downlink flows. That is, the flow priority engine 410 of the modem processor of the UE may determine the priority order of the uplink/downlink flows based on the plurality of inputs received from the multiple specifications or configurations.

In some aspects, the priority level determined by the modem processor may be a two-level priority. The two-level priority may include a first-level priority including a radio bearer priority and a second-level priority including an uplink flow priority. The flow priority engine 410 may combine the priority of the radio bearer and the priority of the uplink flow. In one aspect, the two-level priority may be represented by a floating-point number, the first digit place corresponding with the priority of the radio bearer and the first decimal place corresponding with the priority of the uplink flow. For example, if the flow priority engine 410 determines that a first uplink flow has the uplink flow priority of 1 mapped to a first radio bearer with the radio bearer priority of 4, the first uplink flow may have the two-level priority represented by the priority number 4.1.

In one aspect, the modem processor, including the flow priority engine 410, may map the uplink flows to physical uplink channels based on the determined combined priority order of the uplink flows. In another aspect, the modem processor, including the flow priority engine 410, may also notify the priority list of flows and radio bearers 444 to the applications processors 440. Here, the priority list of flows and radio bearers 444 may include the combined priority order of the uplink/downlink flows determined by the flow priority engine 410. That is, multiple hardware channels may be established between the modem processor and the application processors to carry different uplink/downlink flows based on the priority order. The priority order determined by the modem processor may be different from the priority order of the application processors, and the application processors may refer to the priority order determined by the modem processor to improve the efficiency and/or efficacy of communicating the uplink/downlink flows with the modem processor and the network. In another aspect, the flow priority engine 410 may output actions for other layers on the modem 446, based on the priority order of the uplink flows, to different layers of the modem 442. For example, the flow priority engine 410 may output the actions for other layers on the modem 446 to a modem lower layer stack 442. The modem lower layer stack 442 may control the uplink transmission, and downlink reception based on the combined priority order of the uplink/downlink flows determined by the flow priority engine 410.

FIGS. 5A and 5B are examples 500 and 550 of wireless communication based on a flow priority engine. The flow priority engine may be comprised in a UE. Referring to FIG. 5A, the first example 500 may include a first flow priority engine 510 that may receive LLM filters 520 and flow priority filters 522 from application processors, and receive OEM configuration 524 and NW signaling or specification 526. For example, the LLM filters 520 may indicate that game uplink/downlink flow having a QoS filter ID (QFI) of filter_1 may have the LLM priority, i.e., a priority level of 1, and the flow priority filters 522 may indicate that IMS video uplink/downlink flow having a QFI of filter_2 may have a priority level of 2 and an audio uplink/downlink flow having a QFI of filter_3 may have a priority level of 3.

The modem processor of the UE, including the first flow priority engine 510, may be associated with three radio bearers 532, 534, and 536 configured by the base station. The first radio bearer 532 may have a first radio bearer priority of 4 and be mapped with the game uplink flow. The second radio bearer 534 may have a second radio bearer priority of 3 and be mapped with the video uplink flow. The third radio bearer 536 may have a third radio bearer priority of 2 and be mapped with the audio uplink flow.

The flow priority engine 510 may first determine that the LLM filters 520 and the flow priority filters 522 do not conflict with the list from the OEM configurations 524 and the NW signals or specification 526. Based on the radio bearer priorities of the first, second, and third radio bearers 532, 534, and 536, and the flow priority filters of the game uplink/downlink flow, the video uplink/downlink flow, and the audio uplink/downlink flow, determine a first combined flow priority of game uplink/downlink flow as 4.1, a second combined flow priority of the video uplink/downlink flow as 3.2, and a third combined flow priority of the audio uplink/downlink flow as 2.3.

The flow priority engine 510 may instruct the modem processor to handle the transmission of the uplink flows based on the determined combined flow priorities. In one aspect, the flow priority engine 510 may instruct the modem processor to transmit the audio uplink data packets 537 associated with the third combined flow priority of 2.3 via the third radio bearer 536 having the bearer priority of 2. In another aspect, the flow priority engine 510 may instruct the modem processor to transmit the video uplink data packets 535 associated with the second combined flow priority of 3.2 via the second radio bearer 534 having the bearer priority of 3. In another aspect, the flow priority engine 510 may instruct the modem processor to transmit the game uplink data packets 533 associated with the first combined flow priority of 4.1 via the first radio bearer 532 having the bearer priority of 4.

Referring to FIG. 5B, the second example 550 may include a second flow priority engine 560 that may receive LLM filters 570 and flow priority filters 572 from application processors, and receive OEM configuration 574 and NW signaling or specification 576. For example, the LLM filters 570 may indicate that game uplink/downlink flow has the LLM priority, i.e., a priority level of 1, and the flow priority filters 572 may indicate that IMS video uplink/downlink flow has a priority level of 2 and an audio uplink/downlink flow has a priority level of 3.

The UE of the modem processor, including the second flow priority engine 560, may be associated with internet default bearer radio bearer 582 configured by the base station, and the internet default bearer radio bearer 582 may have a radio bearer priority of 4 and be mapped with all uplink flows. The flow priority engine 560 may first determine that the LLM filters 570 and the flow priority filters 572 do not conflict with the list from the OEM configurations 574 and the NW signals or specification 576. Based on the radio bearer priorities of the internet default bearer radio bearer 582 and the flow priority filters of the game uplink/downlink flow, the video uplink/downlink flow, and the audio uplink/downlink flow, determine a first combined flow priority of game uplink/downlink flow as 4.1, a second combined flow priority of the video uplink/downlink flow as 4.2, and a third combined flow priority of the audio uplink/downlink flow as 4.3.

The flow priority engine 560 may instruct the modem processor to handle the transmission of the uplink flows based on the determined combined flow priorities. In one aspect, the flow priority engine 560 may instruct the modem processor to transmit the game uplink data packets 584 associated with the first combined flow priority of 4.1 via the internet default bearer radio bearer 582 having the bearer priority of 4. In another aspect, the flow priority engine 560 may instruct the modem processor to transmit the video uplink data packets 586 associated with the second combined flow priority of 4.2 via the internet default bearer radio bearer 582, having the bearer priority of 4. In another aspect, the flow priority engine 560 may instruct the modem processor to transmit the audio uplink data packets 588 associated with the third combined flow priority of 4.3 via the internet default bearer radio bearer 582 having the bearer priority of 4. The flow priority engine 560 may map the one or more uplink transmissions to corresponding uplink channels of the internet default bearer radio bearer 582 based on the priorities of the uplink transmissions. In one aspect, the uplink transmission associated with high priority may be mapped to an uplink channel with better channel properties, e.g., path loss, delay, absorption, reflection, multipath, fading, Doppler, etc. In another aspect, the uplink transmission associated with low priority may be dropped in case of insufficient uplink resources to transmit all of the uplink flows.

FIGS. 6A and 6B are examples 600 and 650 of downlink communication flows based on a flow priority engine including aspects described herein. The flow priority engine may be comprised in a UE. Referring to FIG. 6A, the first example 600 may include a first flow priority engine 610 that may receive LLM filters 620 and flow priority filters 622 from application processors, and receive OEM configuration 624 and NW signaling or specification 626. For example, the LLM filters 620 may indicate that game uplink/downlink flow has the LLM priority, i.e., a priority level of 1, and the flow priority filters 622 may indicate that IMS video uplink/downlink flow has a priority level of 2 and an audio uplink/downlink flow has a priority level of 3.

The UE of the modem processor, including the first flow priority engine 610, may be associated with three radio bearers configured by the base station. The first radio bearer may have a first radio bearer priority of 4 and be mapped with the game uplink flow. The second radio bearer may have a second radio bearer priority of 3 and be mapped with the video uplink flow. The third radio bearer may have a third radio bearer priority of 2 and be mapped with the audio uplink flow. The flow priority engine 610 may first determine that the LLM filters 620 and the flow priority filters 622 do not conflict with the list from the OEM configurations 624 and the NW signals or specification 626. Based on the radio bearer priorities of the three radio bearers and the flow priority filters of the game uplink/downlink flow, the video uplink/downlink flow, and the audio uplink/downlink flow, determine a first combined flow priority of game uplink/downlink flow as 4.1, a second combined flow priority of the video uplink/downlink flow as 3.2, and a third combined flow priority of the audio uplink/downlink flow as 2.3.

The flow priority engine 610 may instruct the modem processor to handle the transmission of the downlink flows received from the network based on the determined combined flow priorities. That is, the modem processor, including the flow priority engine 610, may be connected to multiple application processors via a first hardware channel 632 having a high priority and a second hardware channel 634 having a low priority. In one aspect, the flow priority engine 610 may instruct the modem processor to transmit the audio downlink data packets 637 associated with the third combined flow priority of 2.3 to the corresponding application processor via the first hardware channel with high priority. In another aspect, the flow priority engine 610 may instruct the modem processor to transmit the video downlink data packets 635 associated with the second combined flow priority of 3.2 and the game downlink data packets 633 associated with the first combined flow priority of 4.1 to the corresponding application processor via the second hardware channel having the low priority.

Referring to FIG. 6B, the second example 650 may include a second flow priority engine 660 that may receive LLM filters 670 and flow priority filters 672 from application processors, and receive OEM configuration 674 and NW signaling or specification 676. For example, the LLM filters 670 may indicate that game uplink/downlink flow has the LLM priority, i.e., a priority level of 1, and the flow priority filters 672 may indicate that IMS video uplink/downlink flow has a priority level of 2 and an audio uplink/downlink flow has a priority level of 3.

The modem processor of the UE, including the second flow priority engine 660, may be associated with the internet default bearer radio bearer configured by the base station, and the internet default bearer radio bearer may have a radio bearer priority of 4 and be mapped with all uplink flows. The flow priority engine 660 may first determine that the LLM filters 670 and the flow priority filters 672 do not conflict with the list from the OEM configurations 674 and the NW signals or specification 676. Based on the radio bearer priorities of the internet default bearer radio bearer and the flow priority filters of the game uplink/downlink flow, the video uplink/downlink flow, and the audio uplink/downlink flow, determine a first combined flow priority of game uplink/downlink flow as 4.1, a second combined flow priority of the video uplink/downlink flow as 4.2, and a third combined flow priority of the audio uplink/downlink flow as 4.3.

The flow priority engine 660 may instruct the modem processor to handle the transmission of the uplink flows received from the network based on the determined combined flow priorities. That is the modem processor, including the flow priority engine 660, may be connected to multiple application processors via a hardware channel 682. In one aspect, the flow priority engine 660 may instruct the modem processor to transmit the game uplink data packets 684 associated with the first combined flow priority of 4.1 via the hardware channel 682. In another aspect, the flow priority engine 660 may instruct the modem processor to transmit the video uplink data packets 686 associated with the second combined flow priority of 4.2 via the hardware channel 682. In another aspect, the flow priority engine 660 may instruct the modem processor to transmit the audio uplink data packets 688 associated with the third combined flow priority of 4.3 via the hardware channel 682.

Figure 7:
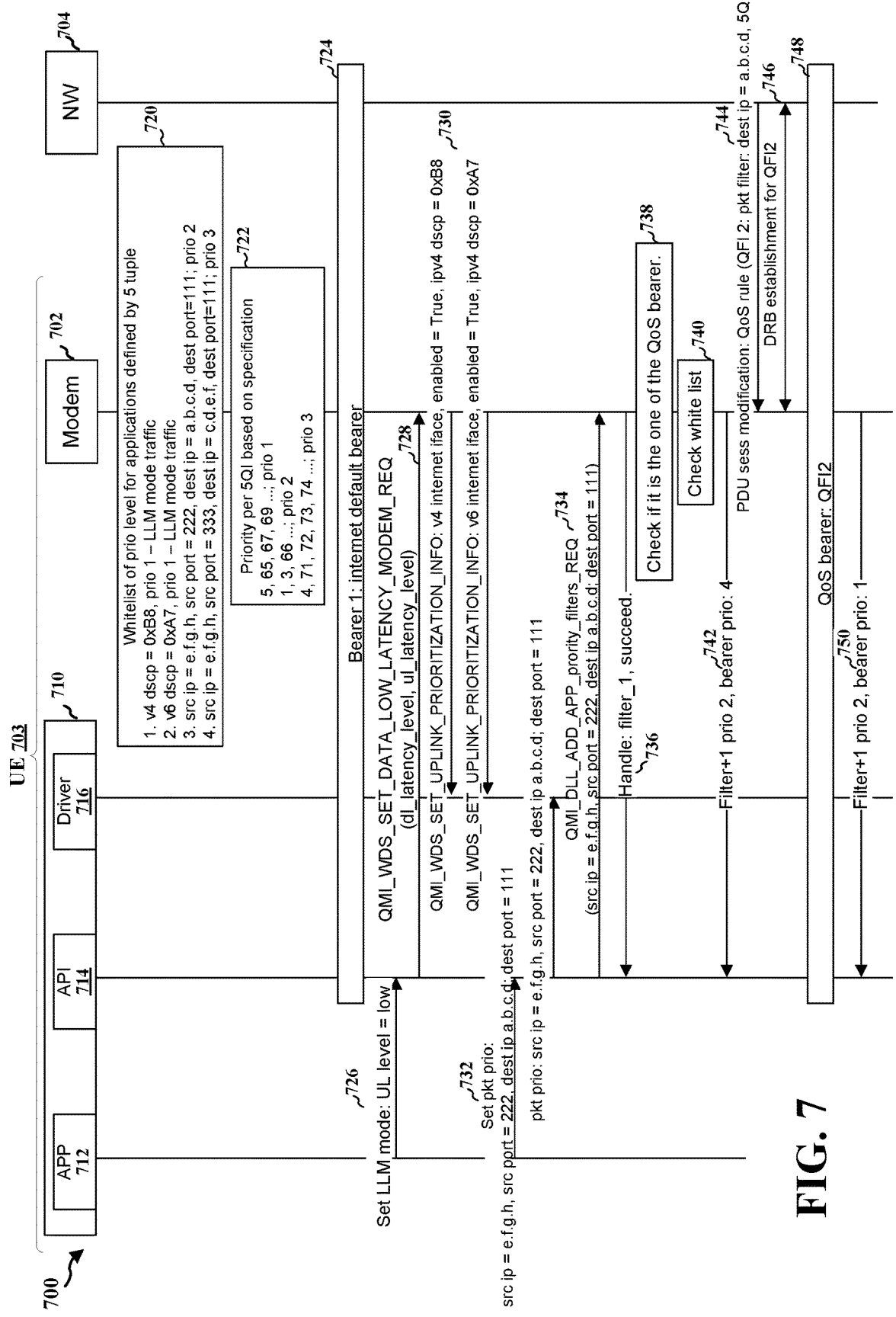
FIG. 7 is an example call flow of a method of wireless communication.

FIG. 7 is an example call flow 700 of a method of wireless communication. The call flow 700 may include a modem processor 702, a network 704, and an application processor 710, including an application 712, application program interfaces (API) 714, and a driver 716. The application processor 710 and modem processor may be comprised in a UE 703. At 720, a list of priority level for applications may be configured in modem 702. For example, an Internet Protocol version 4 (IPv4) differentiated services field codepoint (DSCP) of 0xB8 and an Internet Protocol version 6 (IPv6) DSCP of 0xA7 may have a priority level 1 for LLM mode traffic. A source IP (SRC IP) of e.f.g.h, an SRC port of 222, a destination (DEST) IP of a.b.c.d, and a DEST port of 111 may be associated with a priority level 2, and the SRC IP of e.f.g.h, an SRC port of 333, a DEST IP of c.d.e.f, and a DEST port of 111 may be associated with a priority level 3. At 722, the priority per 5G QoS ID (5QI) may be specified in modem 702. For example, the uplink/downlink flow associated with 5QI 5, 65, 67, 69, etc., may be associated with priority level 1. The uplink/downlink flow associated with 5QI 1, 3, 66, etc., may be associated with the priority level 2, and the uplink/downlink flow associated with 5QI 4, 71, 72, 73, 74, etc., may be associated with the priority level 3.

At 724, the network 704 may configure a first bearer as the internet default bearer. At 726, application 712 of the application processor 710 may instruct the API 714 to set an LLM mode for the uplink priority level to low latency. At 728, the API 714 may, in turn, send the request to set the LLM to the modem processor 702. At 730, the modem processor 702 may respond, based on the list of the priority level at 720, that the priority for LLM is priority level 1. For example, the modem processor 702 may indicate that the IPv4 DSCP of 0xB8 and/or an IPV6 DSCP of 0xA7 may be associated with a priority level 1.

At 732, the application 712 may set a packet priority for packets with SRC IP=e.f.g.h., SRC port=222, DEST IP=a.b.c.d; and DEST port=111 to the modem processor 702 via the API 714 at 734. The modem processor may indicate a successful handling of the filter to the API 714 at 736. At 738, the modem processor 702 may check if the filter 1 if corresponds with one of the QoS bearers. Here, since the network 704 set up only one bearer as the internet default bearer 724, the modem processor 702 may determine that filter_1 does not correspond with one of the QoS bearer. At 740, the modem processor 702 may check the filter_1 with the white list. Here, the list at 720 indicates that the filter_1 may have the priority level 2. Accordingly, the modem processor 702 may determine a combined priority level may be determined as 4.2. At 742, the modem processor 702 may indicate to the API 714 that the combined priority level of the filter_1 is 4.2.

At 744, the modem processor 702 may receive, from the NW 704, a PDU session modification including a QoS rule of QFI 2 packet filter for DEST IP=a.b.c.d, and 5QI=69. At 746, the network 704 may establish with the modem processor 702 a new DRB for QFI2. At 748, a second QoS bearer with QFI_2 may be established between the UE and the NW 704. Here, since the filter_1 is mapped to the new QoS bearer QFI2 with radio bearer priority level 1. Based on the second QoS bearer 748 established between the modem processor 702 and the NW 704, at 750, the modem processor 702 may determine a revised combined priority level as 1.2.

Figure 8:
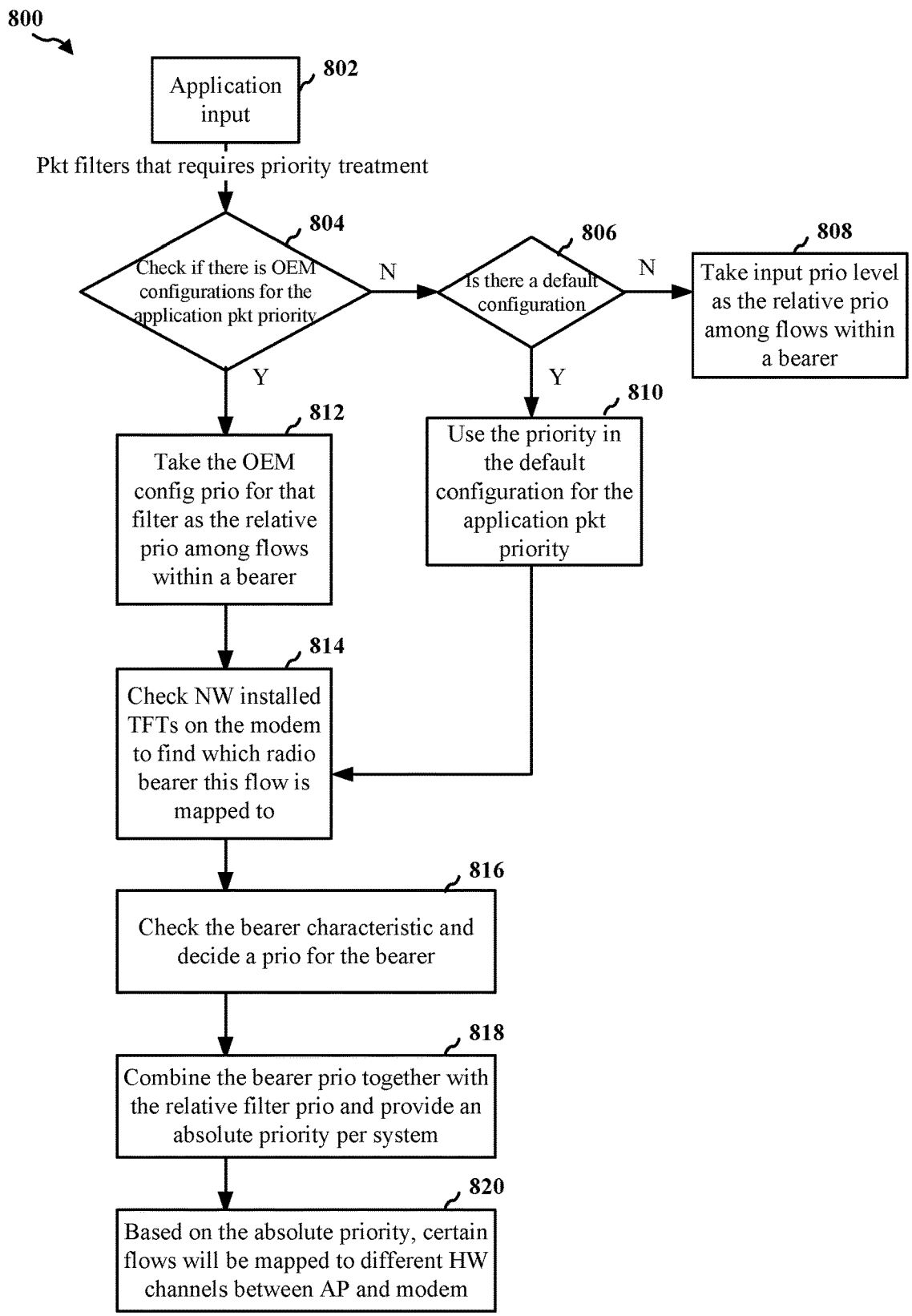
FIG. 8 is a flow chart of packet flow priority engine of a method of wireless communication.

FIG. 8 is a flow chart 800 of packet flow priority engine of a method of wireless communication. The flow chart 800 may be performed by a flow priority engine (e.g., the flow priority engine 410/510/560/610/660) of a UE (e.g., the UE 104/703; the apparatus 1202). At 802, the flow priority engine receives application input from the application processors, and the application input includes packet filters that may request priority treatment for the flow priority engine.

At 804, the flow priority engine first checks if there are OEM configurations for the application packet priority. If the flow priority engine did not receive OEM configurations, the flow priority engine might determine, at 806, whether there is a default configuration for the priority of the packet filters of the application input. If the flow priority engine determines that the packet filters are not covered by the default configuration, at 808, the flow priority engine may take the application input priority level as the relative priority among the flows within a bearer. That is, if the flow priority engine determines that there is no OEM configuration or default configuration that may indicate the priority of the packet filters of the received application input, the flow priority engine may determine the relative priority based on received application input priority level as received from the application processors.

At 810, in response to determining that there is a default configuration for the priority of the packet filters of the application input, the flow priority engine may use the priority in the default configurations for the application packet priority.

At 812, in response to determining that there is an OEM configuration for the application packet priority, the flow priority engine may take the OEM configuration priority for that filter as the relative priority among multiple flows within a bearer.

At 814, the flow priority engine may check network installed traffic flow templates (TFTs) on the modem to find which radio bearer this flow is mapped. At 816, the flow priority engine may check the bearer characteristic and decide a priority for the bearer.

At 818, the flow priority engine may combine the bearer priority together with the relative filter priority and provide an absolute priority per system.

At 820, the flow priority engine may, based on the absolute priority, map certain flows to different HW channels between the application processors and the flow priority engine.

Figure 9:
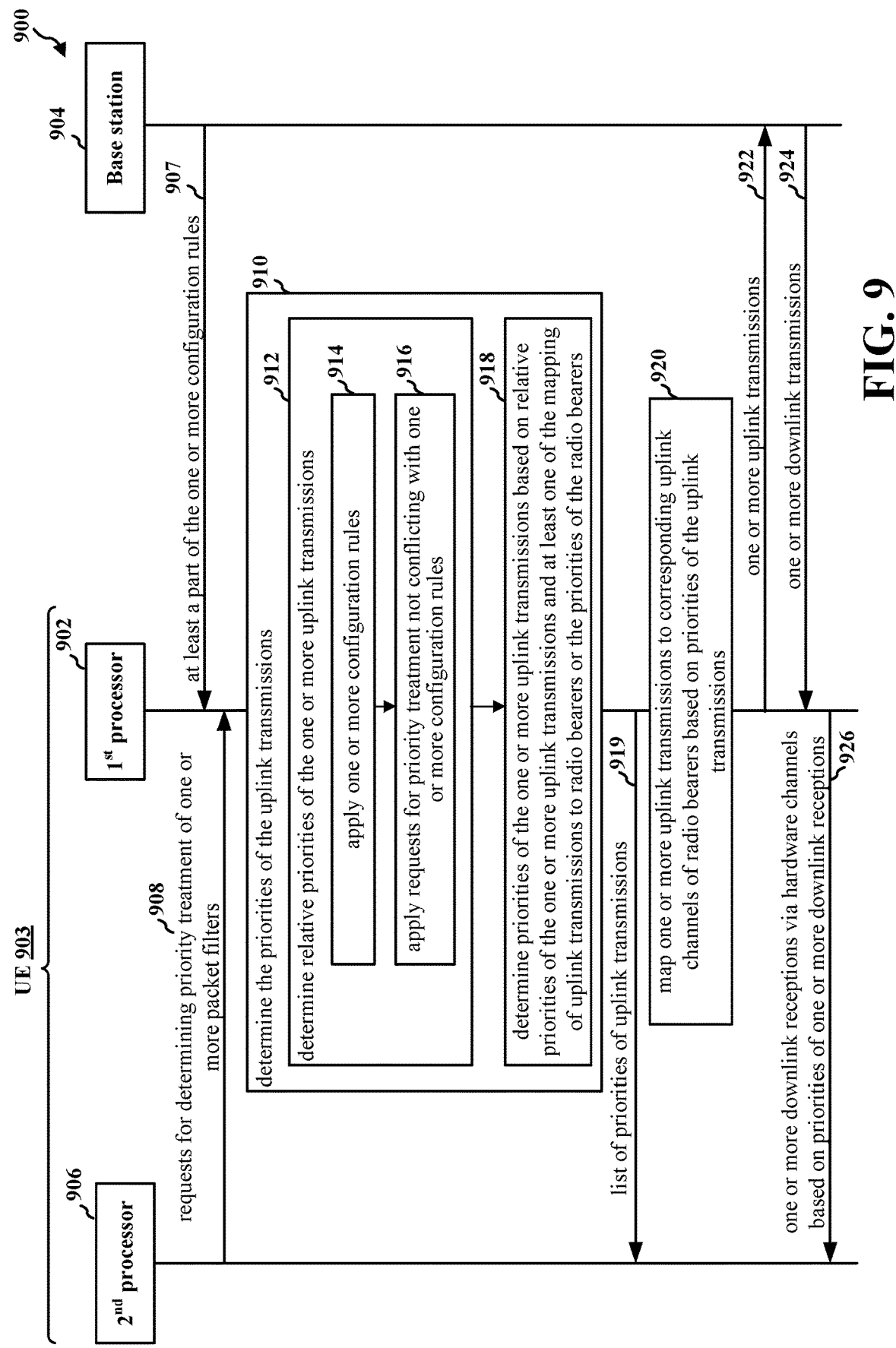
FIG. 9 is a communication diagram of a method of wireless communication.

FIG. 9 is a communication diagram 900 of a method of wireless communication. The communication diagram 900 may include a first processor 902, a base station 904, and a second processor 906. The first processor 902 and the second processor 906 may be a part of a UE 903 communicating with the base station. The first processor 902 may be a modem processor and the second processor 906 may be an application processor. The application processor may be one of multiple application processors of the UE 903. In one aspect, the one or more uplink transmissions may be transmitted from the one or more application processors to the at least one processor, and from the at least one processor to the base station 904 based on priorities of the flows determined by the first processor 902. In another aspect, the first processor 902 may receive the downlink reception from the base station 904 and send the downlink packets to the second processor 906 based on the based on priorities of the flows determined by the first processor 902.

At 907, the first processor 902 may receive, from the base station 904, at least a part of the one or more configuration rules. The first processor 902 may determine priorities of uplink/downlink flows based on one or more configuration rules at 910.

At 908, the first processor 902 may receive, from the second processor 906, requests for determining priority treatment of one or more packet filters of one or more uplink transmissions. In one aspect, the one or more application processors may include at least one of applications, High-level Operating Systems (HLOSs), or application processors, and the requests for priority treatment may be further based on a specification of at least one of the applications, the HLOSs, or the application processors.

At 910, the first processor 902 may determine the priorities of the uplink transmissions based on at least one of the requests for priority treatment received from the one or more application processors, mapping of uplink transmissions to radio bearers, the priorities of the radio bearers, or one or more configuration rules. Here, 910 may include 912 and 918.

At 912, the first processor 902 may determine relative priorities of the one or more uplink transmissions based on at least one of the requests for priority treatment received from the one or more application processors or the one or more configuration rules. Here, 912 may include 914 and 916.

At 914, the first processor 902 may apply the one or more configuration rules. In one aspect, the configuration rules may include an OEM configuration including priorities of at least one of the one or more uplink transmissions. In another aspect, the at least a part of the one or more configuration rules may be received from the base station 904 at 907. In another aspect, at least a part of the one or more configuration rules may be configured at the first processor 902 as a specification.

At 916, the first processor 902 may apply the request for priority treatment received from the one or more application processors that are not conflicting with the one or more configuration rules.

At 918, the first processor 902 may determine the priorities of the one or more uplink transmissions based on the relative priorities of the one or more uplink transmissions and at least one of the mapping of uplink transmissions to radio bearers or the priorities of the radio bearers. In one aspect, the priorities of the radio bearers may be based on corresponding radio bearers mapped to each uplink transmission of the one or more uplink transmissions.

In some aspects, the priority level determined by the modem processor may be a two-level priority. The two-level priority may include a first level priority including a radio bearer priority and a second level priority including an uplink flow priority.

At 919, the first processor 902 may notify the priority list of flows and radio bearers to the second processor 906. In one aspect, the priority list of flows and radio bearers may include the combined priority order of the uplink/downlink flows determined by the first processor 902. In one aspect, the two level priority may be represented by a floating point number, the first digit place corresponding with the priority of the radio bearer and the first decimal place corresponding with the priority of the uplink flow. For example, if the flow priority engine 410 determines that a first uplink flow has the uplink flow priority of 1 mapped to a first radio bearer with the radio bearer priority of 4, the first uplink flow may have the two-level priority represented by the priority number 4.1.

At 920, the first processor 902 may map the one or more uplink transmissions to corresponding uplink channels of radio bearers based on the priorities of the uplink transmissions. In one aspect, the uplink transmission associated with high priority may be mapped to a uplink channel with better channel properties, e.g., path loss, delay, absorption, reflection, multipath, fading, Doppler, etc. In another aspect, the uplink transmission associated with low priority may be dropped in case of insufficient uplink resources to transmit all of the uplink flows.

At 922, the first processor 902 may transmit the one or more uplink transmissions received from the one or more application processors to the base station 904 based on the priorities of the one or more uplink transmissions. At 924, the first processor 902 may receive one or more downlink transmissions from the base station 904.

At 926, the first processor 902 may transmit the one or more downlink receptions to the one or more application processors via hardware channels based on priorities of one or more downlink receptions. In one aspect, the priorities of the one or more downlink receptions may be associated with the priorities of the one or more uplink transmissions. For example, the priorities of the one or more downlink receptions may be the same as the priorities of the one or more uplink transmissions.

Figure 10:
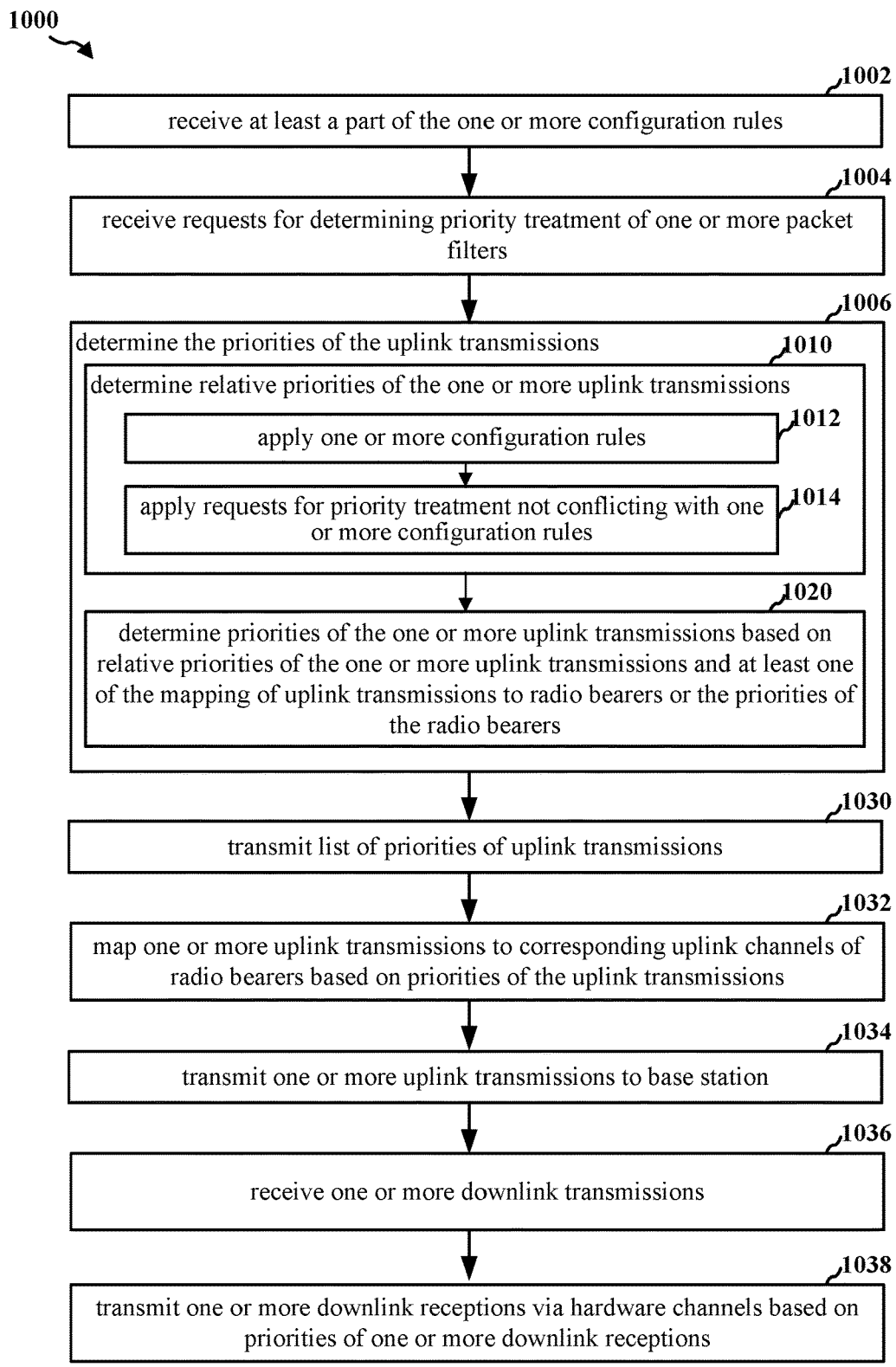
FIG. 10 is a flowchart of a method of wireless communication.

FIG. 10 is a flowchart 1000 of a method of wireless communication. The method may be performed by a first processor (e.g., the modem processor 702; the first processor 902) of a UE (e.g., the UE 104; the apparatus 1202), including the flow priority engine 410/510/560/610/660. The first processor may be a modem processor. In one aspect, the one or more uplink transmissions may be transmitted from the one or more application processors to the at least one processor, and from the at least one processor to the base station based on priorities of the flows determined by the first processor. In another aspect, the first processor may receive the downlink reception from the base station and send the downlink packets to the second processor based on the based on priorities of the flows determined by the first processor.

At 1002, the UE may receive, from the base station, at least a part of the one or more configuration rules. The first processor may determine priorities of uplink/downlink flows based on one or more configuration rules at 1006. For example, at 907, the first processor 902 may receive, from the base station 904, at least a part of the one or more configuration rules. Furthermore, 1002 may be performed by a flow priority engine component 1240.

At 1004, the UE may receive, from the second processor, requests for determining priority treatment of one or more packet filters of one or more uplink transmissions. In one aspect, the one or more application processors may include at least one of applications, HLOSs, or application processors, and the requests for priority treatment may be further based on a specification of at least one of the applications, the HLOSs, or the application processors. For example, at 908, the first processor 902 may receive, from the second processor 906, requests for determining priority treatment of one or more packet filters of one or more uplink transmissions. Furthermore, 1004 may be performed by the flow priority engine component 1240.

At 1006, the UE may determine the priorities of the uplink transmissions based on at least one of the requests for priority treatment received from the one or more application processors, mapping of uplink transmissions to radio bearers, the priorities of the radio bearers, or one or more configuration rules. Here, 1006 may include 1010 and 1020. For example, at 910, the first processor 902 may determine the priorities of the uplink transmissions based on at least one of the requests for priority treatment received from the one or more application processors, mapping of uplink transmissions to radio bearers, the priorities of the radio bearers, or one or more configuration rules.

At 1010, the UE may determine relative priorities of the one or more uplink transmissions based on at least one of the requests for priority treatment received from the one or more application processors or the one or more configuration rules. Here, 1010 may include 1012 and 1014. For example, at 912, the first processor 902 may determine relative priorities of the one or more uplink transmissions based on at least one of the requests for priority treatment received from the one or more application processors or the one or more configuration rules.

At 1012, the UE may apply the one or more configuration rules. In one aspect, the configuration rules may include an OEM configuration including priorities of at least one of the one or more uplink transmissions. In another aspect, the at least a part of the one or more configuration rules may be received from the base station at 1002. In another aspect, at least a part of the one or more configuration rules may be configured at the first processor as a specification. For example, at 914, the first processor 902 may apply the one or more configuration rules.

At 1014, the UE may apply the request for priority treatment received from the one or more application processors that are not conflicting with the one or more configuration rules. For example, at 916, the first processor 902 may apply the request for priority treatment received from the one or more application processors that are not conflicting with the one or more configuration rules.

At 1020, the UE may determine the priorities of the one or more uplink transmissions based on the relative priorities of the one or more uplink transmissions and at least one of the mapping of uplink transmissions to radio bearers or the priorities of the radio bearers. In one aspect, the priorities of the radio bearers may be based on corresponding radio bearers mapped to each uplink transmission of the one or more uplink transmissions. For example, at 918, the first processor 902 may determine the priorities of the one or more uplink transmissions based on the relative priorities of the one or more uplink transmissions and at least one of the mapping of uplink transmissions to radio bearers or the priorities of the radio bearers. Furthermore, 1006, 1010, 1012, 1014, and 1020 may be performed by the flow priority engine component 1240.

In some aspects, the priority level determined by the modem processor may be a two-level priority. The two-level priority may include a first level priority including a radio bearer priority and a second level priority including an uplink flow priority.

At 1030, the UE may notify the priority list of flows and radio bearers to the second processor. In one aspect, the priority list of flows and radio bearers may include the combined priority order of the uplink/downlink flows determined by the first processor. In one aspect, the two level priority may be represented by a floating point number, the first digit place corresponding with the priority of the radio bearer and the first decimal place corresponding with the priority of the uplink flow. For example, if the flow priority engine 410 determines that a first uplink flow has the uplink flow priority of 1 mapped to a first radio bearer with the radio bearer priority of 4, the first uplink flow may have the two-level priority represented by the priority number 4.1. For example, at 919, the first processor 902 may notify the priority list of flows and radio bearers to the second processor. Furthermore, 1030 may be performed by the flow priority engine component 1240.

At 1032, the UE may map the one or more uplink transmissions to corresponding uplink channels of radio bearers based on the priorities of the uplink transmissions. In one aspect, the uplink transmission associated with high priority may be mapped to a uplink channel with better channel properties, e.g., path loss, delay, absorption, reflection, multipath, fading, Doppler, etc. In another aspect, the uplink transmission associated with low priority may be dropped in case of insufficient uplink resources to transmit all of the uplink flows. For example, at 920, the first processor 902 may map the one or more uplink transmissions to corresponding uplink channels of radio bearers based on the priorities of the uplink transmissions. Furthermore, 1032 may be performed by a UL/DL transmission component 1242.

At 1034, the UE may transmit the one or more uplink transmissions received from the one or more application processors to a base station based on the priorities of the one or more uplink transmissions. For example, at 922, the first processor 902 may transmit the one or more uplink transmissions received from the one or more application processors to the base station 904 based on the priorities of the one or more uplink transmissions. Furthermore, 1034 may be performed by the UL/DL transmission component 1242.

At 1036, the UE may receive one or more downlink transmissions from the base station. For example, at 924, the first processor 902 may receive one or more downlink transmissions from the base station 904. Furthermore, 1036 may be performed by the UL/DL transmission component 1242.

At 1038, the UE may transmit the one or more downlink receptions to the one or more application processors via hardware channels based on priorities of one or more downlink receptions. In one aspect, the priorities of the one or more downlink receptions may be associated with the priorities of the one or more uplink transmissions. For example, the priorities of the one or more downlink receptions may be the same as the priorities of the one or more uplink transmissions. For example, at 926, the first processor 902 may transmit the one or more downlink receptions to the one or more application processors via hardware channels based on priorities of one or more downlink receptions. Furthermore, 1038 may be performed by the UL/DL transmission component 1242.

Figure 11:
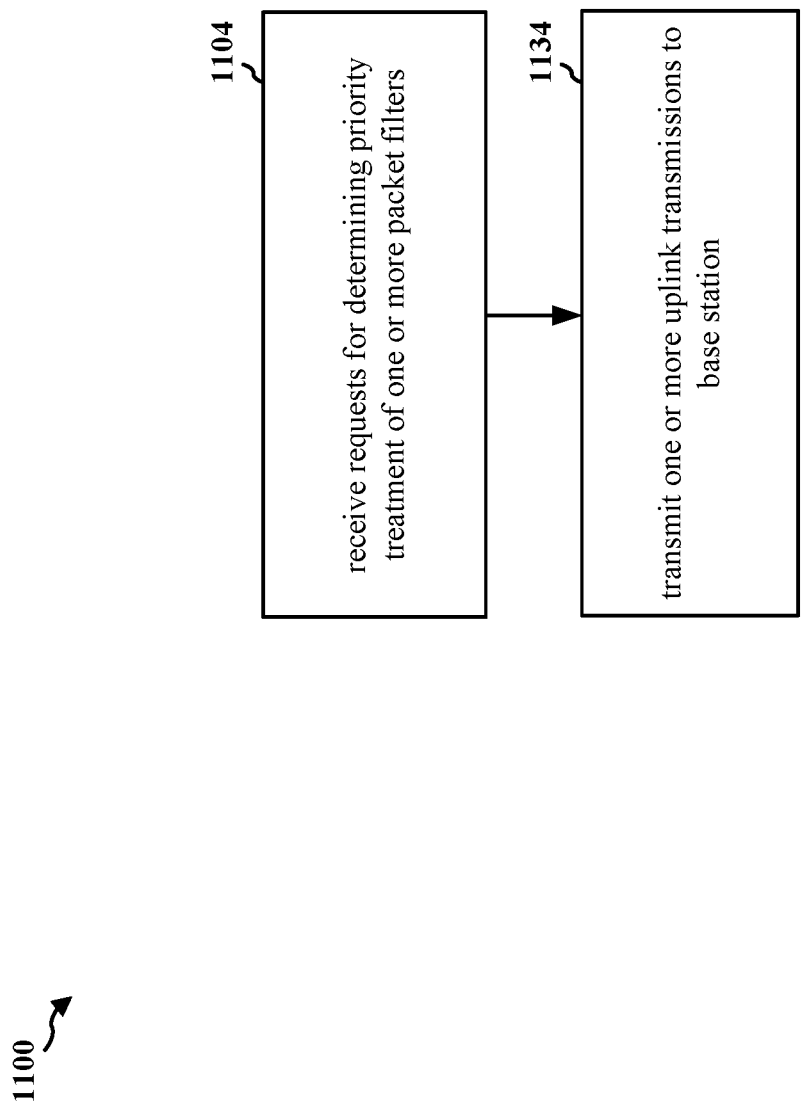
FIG. 11 is a flowchart of a method of wireless communication.

FIG. 11 is a flowchart 1100 of a method of wireless communication. The method may be performed by a first processor (e.g., the modem processor 702; the first processor 902) of a UE (e.g., the UE 104; the apparatus 1202), including the flow priority engine 410/510/560/610/660. The first processor may be a modem processor. In one aspect, the one or more uplink transmissions may be transmitted from the one or more application processors to the at least one processor, and from the at least one processor to the base station based on priorities of the flows determined by the first processor. In another aspect, the first processor may receive the downlink reception from the base station and send the downlink packets to the second processor based on the based on priorities of the flows determined by the first processor.

At 1104, the UE may receive, from the second processor, requests for determining priority treatment of one or more packet filters of one or more uplink transmissions. In one aspect, the one or more application processors may include at least one of applications, HLOSs, or application processors, and the requests for priority treatment may be further based on a specification of at least one of the applications, the HLOSs, or the application processors. For example, at 908, the first processor 902 may receive, from the second processor 906, requests for determining priority treatment of one or more packet filters of one or more uplink transmissions. Furthermore, 1104 may be performed by the flow priority engine component 1240.

At 1134, the UE may transmit the one or more uplink transmissions received from the one or more application processors to a base station based on the priorities of the one or more uplink transmissions. For example, at 922, the first processor 902 may transmit the one or more uplink transmissions received from the one or more application processors to the base station 904 based on the priorities of the one or more uplink transmissions. Furthermore, 1134 may be performed by the UL/DL transmission component 1242.

Figure 12:
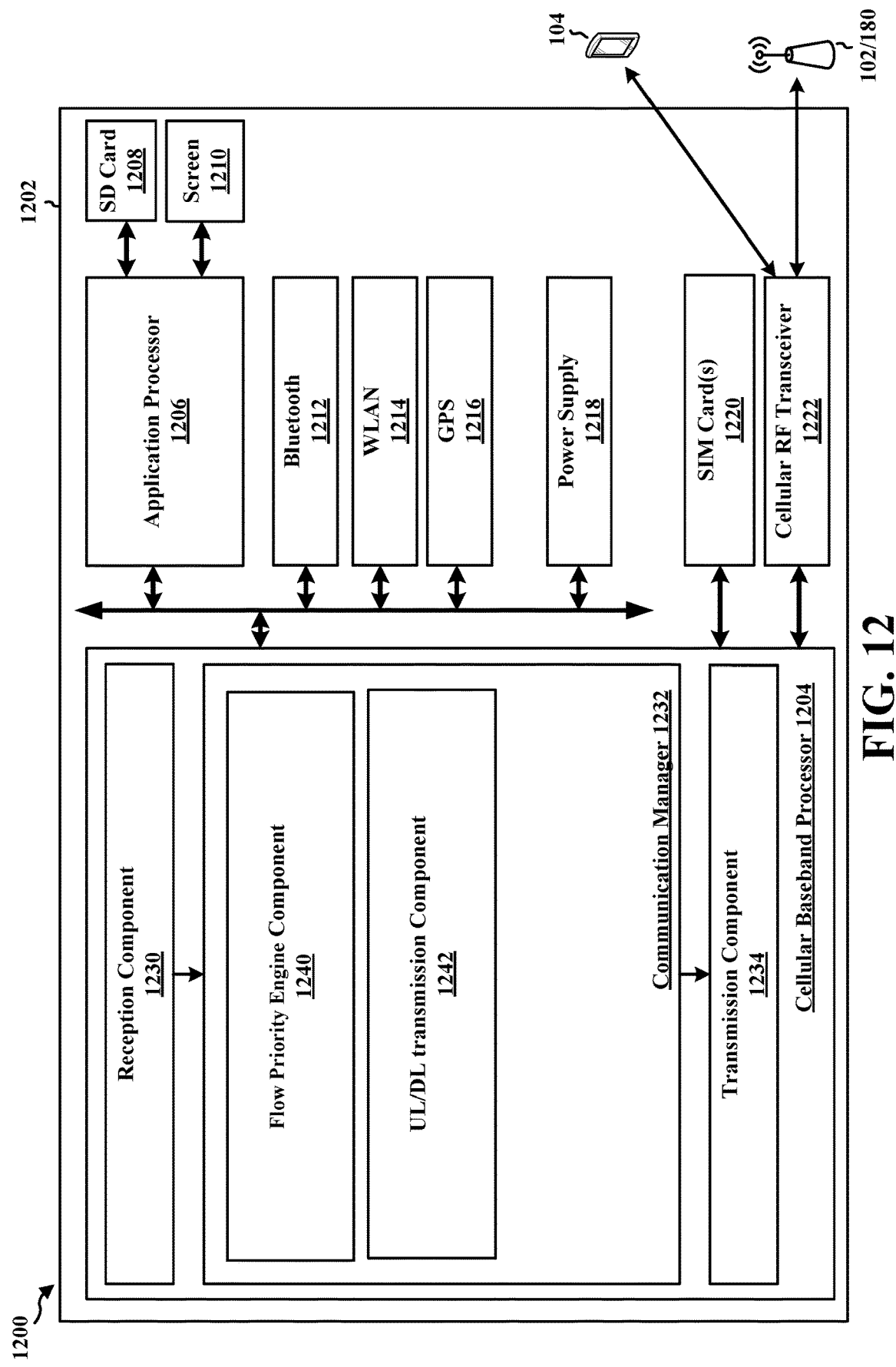
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1002 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 124 and/or BS 122/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a flow priority engine component 1240 that is configured to receive at least a part of the one or more configuration rules, receive requests for determining priority treatment of one or more packet filters of one or more uplink transmissions, determine the priorities of the uplink transmissions, determine relative priorities of the one or more uplink transmissions, apply the one or more configuration rules, apply the request for priority treatment received from the one or more application processors that are not conflicting with the one or more configuration rules, determine the priorities of the one or more uplink transmissions based on the relative priorities of the one or more uplink transmissions and at least one of the mapping of uplink transmissions to radio bearers or the priorities of the radio bearers, and notify the priority list of flows and radio bearers to the second processor, e.g., as described in connection with 1002, 1004, 1006, 1010, 1012, 1014, 1020, 1030, and 1104. The communication manager 1232 further includes a UL/DL transmission component 1242 that is configured to map the one or more uplink transmissions to corresponding uplink channels of radio bearers based on the priorities of the uplink transmissions, transmit the one or more uplink transmissions received from the one or more application processors to a base station based on the priorities of the one or more uplink transmissions, receive one or more downlink transmissions from the base station, and transmit the one or more downlink receptions to the one or more application processors via hardware channels based on priorities of one or more downlink receptions, e.g., as described in connection with 1032, 1034, 1036, 1038, and 1134.

The apparatus may include additional components that perform each of the blocks of the algorithm in the flowcharts of FIGS. 9, 10, and 11. As such, each block in the flowcharts of FIGS. 9, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving, from one or more application processors, requests for determining priority treatment of one or more packet filters of one or more uplink transmissions, and means for transmitting the one or more uplink transmissions from the one or more application processors to a base station based on priorities of the one or more uplink transmissions. The apparatus 1202 includes means for determining the priorities of the uplink transmissions based on at least one of the requests for priority treatment received from the one or more application processors, mapping of uplink transmissions to radio bearers, the priorities of the radio bearers, or one or more configuration rules. The apparatus 1202 includes means for determining relative priorities of the one or more uplink transmissions based on at least one of the requests for priority treatment received from the one or more application processors or the one or more configuration rules, and means for determining the priorities of the one or more uplink transmissions based on the relative priorities of the one or more uplink transmissions and at least one of the mapping of uplink transmissions to radio bearers or the priorities of the radio bearers. The apparatus 1202 includes means for applying the one or more configuration rules, and means for applying the request for priority treatment received from the one or more application processors not conflicting with the one or more configuration rules. The apparatus 1202 includes means for receiving, from the base station, at least a part of the one or more configuration rules, and means for mapping the one or more uplink transmissions to corresponding uplink channels of radio bearers based on the priorities of the uplink transmissions. The apparatus 1202 includes means for receiving one or more downlink receptions from the base station, and means for transmitting the one or more downlink receptions to the one or more application processors via hardware channels based on priorities of one or more downlink receptions. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

The apparatus may include a UE including one or more application processors and a modem processor. The modem processor may include flow priority engine configured to receive, from the one or more application processors, requests for determining priority treatment of one or more packet filters of one or more uplink transmissions and transmit the one or more uplink transmissions to a base station based on priorities of the one or more uplink transmissions. The priorities of the uplink transmissions may be determined based on at least one of the requests for priority treatment received from the one or more application processors, mapping of uplink transmissions to radio bearers, the priorities of the radio bearers, or one or more configuration rules.

In one aspect, the flow priority engine may determine relative priorities of the one or more uplink transmissions based on at least one of the requests for priority treatment received from the one or more application processors or the one or more configuration rules, and determine the priorities of the one or more uplink transmissions based on the relative priorities of the one or more uplink transmissions and at least one of the mapping of uplink transmissions to radio bearers or the priorities of the radio bearers. It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including a memory and at least one processor coupled to the memory, the at least one processor and the memory configured to receive, from one or more application processors, requests for determining priority treatment of one or more packet filters of one or more uplink transmissions, and transmit the one or more uplink transmissions from the one or more application processors to a base station based on priorities of the one or more uplink transmissions.

Aspect 2 is the apparatus of aspect 1, where the one or more application processors includes at least one of applications, HLOSs, or application processors.

Aspect 3 is the apparatus of aspect 2, where the requests for priority treatment is further based on a specification of at least one of the applications, the HLOSs, or the application processors.

Aspect 4 is the apparatus of any of aspects 1 to 3, where the one or more uplink transmissions are transmitted from the one or more application processors to the at least one processor, and from the at least one processor to the base station.

Aspect 5 is the apparatus of any of aspects 1 to 4, where the at least one processor and the memory are further configured to determine the priorities of the uplink transmissions based on at least one of the requests for priority treatment received from the one or more application processors, mapping of uplink transmissions to radio bearers, the priorities of the radio bearers, or one or more configuration rules.

Aspect 6 is the apparatus of aspect 5, where the one or more configuration rules include an OEM configuration including priorities of at least one of the one or more uplink transmissions.

Aspect 7 is the apparatus of aspect 5, where the at least one processor and the memory configured to determine the priorities of the one or more uplink transmissions are further configured to determine relative priorities of the one or more uplink transmissions based on at least one of the requests for priority treatment received from the one or more application processors or the one or more configuration rules, and determine the priorities of the one or more uplink transmissions based on the relative priorities of the one or more uplink transmissions and at least one of the mapping of uplink transmissions to radio bearers or the priorities of the radio bearers.

Aspect 8 is the apparatus of aspect 7, where the at least one processor and the memory configured to determine the relative priorities of the one or more uplink transmissions are configured to apply the one or more configuration rules, and apply the request for priority treatment received from the one or more application processors not conflicting with the one or more configuration rules.

Aspect 9 is the apparatus of any of aspects 5 to 8, where the at least one processor and the memory are further configured to receive, from the base station, at least a part of the one or more configuration rules.

Aspect 10 is the apparatus of any of aspects 5 to 9, where at least a part of the one or more configuration rules is configured at the UE.

Aspect 11 is the apparatus of any of aspects 5 to 10, where the priorities of the radio bearers are based on corresponding radio bearers mapped to each uplink transmission of the one or more uplink transmissions.

Aspect 12 is the apparatus of any of aspects 1 to 11, where the at least one processor and the memory configured to transmit the one or more uplink transmissions to the base station are further configured to map the one or more uplink transmissions to corresponding uplink channels of radio bearers based on the priorities of the uplink transmissions.

Aspect 13 is the apparatus of any of aspects 1 to 12, where the at least one processor and the memory are further configured to receive one or more downlink receptions from the base station, and transmit the one or more downlink receptions to the one or more application processors via hardware channels based on priorities of one or more downlink receptions.

Aspect 14 is the apparatus of aspect 13, where the priorities of the one or more downlink receptions are associated with the priorities of the one or more uplink transmissions.

Aspect 15 is a method of wireless communication for implementing any of aspects 1 to 14.

Aspect 16 is an apparatus for wireless communication including means for implementing any of aspects 1 to 14.

Aspect 17 is a computer-readable medium storing computer executable code, where the code when executed by a processor causes the processor to implement any of aspects 1 to 14.

What is claimed is:

1. An apparatus for wireless communication at a user equipment (UE), comprising:
   memory;
   at least one processor coupled to the memory;
   one or more application processors; and
   at least two hardware channels between the at least one processor and the one or more application processors, wherein each hardware channel is associated with a different priority, and wherein the at least one processor is configured to cause the UE to:
      receive, from the one or more application processors, requests for determining a priority treatment of one or more packet filters of one or more uplink transmissions;
      map the one or more uplink transmissions to corresponding uplink channels of radio bearers based on priorities of the one or more uplink transmissions and based on channel properties of the corresponding uplink channels, wherein the priorities of the one or more uplink transmissions are based at least on a quality of service (QOS) filter identity (QFI) associated with a flow priority and a traffic type associated with priorities of the radio bearers; and
      transmit the one or more uplink transmissions from the one or more application processors to the at least one processor via one or more corresponding hardware channels of the at least two hardware channels, wherein the one or more of the corresponding hardware channels are determined based on the priorities of the one or more uplink transmissions, and wherein the one or more uplink transmissions are transmitted from the at least one processor to a base station.

2. The apparatus of claim 1, wherein the one or more application processors includes at least one of applications, High-level Operating Systems (HLOSs), or application processors.

3. The apparatus of claim 2, wherein the requests for determining the priority treatment is further based on a specification of at least one of the applications, the HLOSs, or the application processors.

4. The apparatus of claim 1, wherein the at least one processor is further configured to cause the UE to:
   determine the priorities of the one or more uplink transmissions based on at least one of the requests for the priority treatment received from the one or more application processors, mapping of uplink transmissions to the radio bearers, the priorities of the radio bearers, or one or more configuration rules.

5. The apparatus of claim 4, wherein the one or more configuration rules include an original equipment manufacturer (OEM) configuration including the priorities of at least one of the one or more uplink transmissions.

6. The apparatus of claim 4, wherein to determine the priorities of the one or more uplink transmissions, the at least one processor is further configured to cause the UE to:
   determine relative priorities of the one or more uplink transmissions based on at least one of the requests for the priority treatment received from the one or more application processors or the one or more configuration rules; and
   determine the priorities of the one or more uplink transmissions based on the relative priorities of the one or more uplink transmissions and the priorities of the radio bearers.

7. The apparatus of claim 6, wherein to determine the relative priorities of the one or more uplink transmissions, the at least one processor is further configured to cause the UE to:
   apply the one or more configuration rules; and
   apply the requests for the priority treatment received from the one or more application processors not conflicting with the one or more configuration rules.

8. The apparatus of claim 4, wherein the at least one processor is further configured to cause the UE to receive, from the base station, at least a part of the one or more configuration rules.

9. The apparatus of claim 4, wherein at least a part of the one or more configuration rules is configured at the UE.

10. The apparatus of claim 4, wherein the priorities of the radio bearers are based on corresponding radio bearers mapped to each uplink transmission of the one or more uplink transmissions.

11. The apparatus of claim 1, wherein the at least one processor is further configured to cause the UE to:
   receive one or more downlink receptions from the base station; and
   transmit the one or more downlink receptions to the one or more application processors via hardware channels based on the priorities of the one or more downlink receptions.

12. The apparatus of claim 11, wherein the priorities of the one or more downlink receptions are associated with the priorities of the one or more uplink transmissions.

13. A method of wireless communication at a user equipment (UE) including at least one processor, one or more application processors, and at least two hardware channels between the at least one processor and the one or more application processors, wherein each hardware channel is associated with a different priority, the method comprising:
   receiving, from the one or more application processors, requests for determining priority treatment of one or more packet filters of one or more uplink transmissions;
   mapping the one or more uplink transmissions to corresponding uplink channels of radio bearers based on priorities of the one or more uplink transmissions and based on channel properties of the corresponding uplink channels, wherein the priorities of the one or more uplink transmissions are based at least on a quality of service (QOS) filter identity (QFI) associated with a flow priority and a traffic type associated with priorities of the radio bearers; and
   transmitting the one or more uplink transmissions from the one or more application processors to the at least one processor via one or more corresponding hardware channels of the at least two hardware channels, wherein the one or more of the corresponding hardware channels are determined based on the priorities of the one or more uplink transmissions, and wherein the one or more uplink transmissions are transmitted from the at least one processor to a base station.

14. The method of claim 13, wherein the one or more application processors includes at least one of applications, High-level Operating Systems (HLOSs), or application processors.

15. The method of claim 14, wherein the requests for determining the priority treatment is further based on a specification of at least one of the applications, the HLOSs, or the application processors.

16. The method of claim 13, further comprising:
determining the priorities of the one or more uplink transmissions based on at least one of the requests for the priority treatment received from the one or more application processors, mapping of uplink transmissions to the radio bearers, the priorities of the radio bearers, or one or more configuration rules.

17. The method of claim 16, wherein the one or more configuration rules include an original equipment manufacturer (OEM) configuration including the priorities of at least one of the one or more uplink transmissions.

18. The method of claim 16, wherein the determining the priorities of the one or more uplink transmissions further comprises:
determining relative priorities of the one or more uplink transmissions based on at least one of the requests for the priority treatment received from the one or more application processors or the one or more configuration rules; and
determining the priorities of the one or more uplink transmissions based on the relative priorities of the one or more uplink transmissions and the priorities of the radio bearers.

19. The method of claim 18, wherein the determining the relative priorities of the one or more uplink transmissions further comprises:
applying the one or more configuration rules; and
applying the requests for the priority treatment received from the one or more application processors not conflicting with the one or more configuration rules.

20. The method of claim 16, further comprising receiving, from the base station, at least a part of the one or more configuration rules.

21. The method of claim 16, wherein at least a part of the one or more configuration rules is configured at the UE.

22. The method of claim 16, wherein the priorities of the radio bearers are based on corresponding radio bearers mapped to each uplink transmission of the one or more uplink transmissions.

23. The method of claim 13, further comprises:
receiving one or more downlink receptions from the base station; and
transmitting the one or more downlink receptions to the one or more application processors via hardware channels based on the priorities of the one or more downlink receptions.

24. The method of claim 23, wherein the priorities of the one or more downlink receptions are associated with the priorities of the one or more uplink transmissions.

25. An apparatus for wireless communication at a user equipment (UE) including at least one processor, one or more application processors, and at least two hardware channels between the at least one processor and the one or more application processors, wherein each hardware channel is associated with a different priority, comprising:
means for receiving, from the one or more application processors, requests for determining priority treatment of one or more packet filters of one or more uplink transmissions;
means for mapping the one or more uplink transmissions to corresponding uplink channels of radio bearers based on priorities of the one or more uplink transmissions and based on channel properties of the corresponding uplink channels, wherein the priorities of the one or more uplink transmissions are based at least on a quality of service (QOS) filter identity (QFI) associated with a flow priority and a traffic type associated with priorities of the radio bearers; and
means for transmitting the one or more uplink transmissions from the one or more application processors to the at least one processor via one or more corresponding hardware channels of the at least two hardware channels, wherein the one or more of the corresponding hardware channels are determined based on the priorities of the one or more uplink transmissions, and wherein the one or more uplink transmissions are transmitted from the at least one processor to a base station.

26. A non-transitory computer-readable medium storing computer executable code at a user equipment (UE) including at least one processor, one or more application processors, and at least two hardware channels between the at least one processor and the one or more application processors, wherein each hardware channel is associated with a different priority, the code when executed by the at least one processor causes the UE to:
receive, from the one or more application processors, requests for determining priority treatment of one or more packet filters of one or more uplink transmissions;
map the one or more uplink transmissions to corresponding uplink channels of radio bearers based on priorities of the one or more uplink transmissions and based on channel properties of the corresponding uplink channels, wherein the priorities of the one or more uplink transmissions are based at least on a quality of service (QOS) filter identity (QFI) associated with a flow priority and a traffic type associated with priorities of the radio bearers; and
transmit the one or more uplink transmissions from the one or more application processors to the at least one processor via one or more corresponding hardware channels of the at least two hardware channels, wherein the one or more of the corresponding hardware channels are determined based on the priorities of the one or more uplink transmissions, and wherein the one or more uplink transmissions are transmitted from the at least one processor to a base station.

* * * * *